United States Patent [19]

Bibbens

[11] 4,181,210

[45] Jan. 1, 1980

[54] CLUTCH WITH INTERLOCKING TEETH

[76] Inventor: William H. Bibbens, N. Park Towers, Apt. 820, 16500 N. Park Dr., Southfield, Mich. 48075

[21] Appl. No.: 909,250

[22] Filed: May 24, 1978

[51] Int. Cl.$^2$ ............................................. F16D 23/02
[52] U.S. Cl. ............................... 192/114 T; 192/53 G
[58] Field of Search .................. 192/114 T, 108, 53 G

[56] References Cited

U.S. PATENT DOCUMENTS

| | | | |
|---|---|---|---|
| 1,935,965 | 11/1933 | Wahlberg | 192/108 X |
| 3,249,188 | 5/1966 | Maina | 192/67 R |
| 3,334,715 | 8/1967 | Bibbens | 192/67 R |
| 3,367,462 | 2/1968 | Bibbens | 192/55 |
| 3,537,558 | 11/1970 | Bibbens | 192/114 T |
| 3,620,338 | 11/1971 | Tomita et al. | 192/53 F |

*Primary Examiner*—Benjamin Wyche
*Attorney, Agent, or Firm*—Reising, Ethington, Barnard, Perry & Brooks

[57] ABSTRACT

Torque transmitting apparatus (10) including a shiftable sleeve member (12) having locking and guiding splines (26a and b) for coupling a first toothed member (14) having external teeth (34) to either one of a pair of toothed members (16), having external teeth (20), and spaced on axially opposite sides thereof. Each locking spline (26a) has working faces (40) whose ends include recesses (38) for axially holding the sleeve member during the transmission of torque to prevent undesirable disengagement during the transmission of torque. The recesses at each end of each locking spline (26a) are spaced from each other with substantially the same minimum chordal relationship as the end of each of the other locking splines. Each guiding spline (26b) has working faces (44) which are spaced so that the chordal thickness therebetween is substantially equal to or less than the corresponding minimum chordal thickness between the recesses at the ends of each locking spline. When the sleeve member (12) is shifted on the first toothed member (14) into engagement with one of the toothed members (16), the relationship between the locking and guiding splines is such that the guiding splines serve to maintain proper axial alignment between the three members (12, 14, 16) and the locking splines serve to prevent undesirable axial disengagement of the locking spline 26a of sleeve member (12) from the teeth (20) of the toothed member (16) during torque transmission. The guiding splines (26b) also cooperate with the teeth (34) of member (14) while disengaging the locking teeth (26a) from the teeth (20) of member (16) to axially guide the sleeve member (12) in the opposite direction. In one preferred embodiment, the locking and guiding splines are arranged in an alternating relationship with each other. Another preferred embodiment has three guiding splines preferably equally circumferentially spaced with respect to each other about the sleeve member.

5 Claims, 11 Drawing Figures

CLUTCH WITH INTERLOCKING TEETH

TECHNICAL FIELD

This invention relates generally to torque transmitting apparatus and more particularly to an improved spline construction of a shiftable sleeve member for transmitting torque between a first toothed member and either of a pair of toothed members spaced on axial opposite sides of the first member.

BACKGROUND ART

Transmissions include a plurality of torque transmitting paths between input and output shafts so as to control the speed at which the input shaft drives the output shaft. Selection of the particular path through which the torque is transmitted can be controlled by a shiftable sleeve member that is moved axially to selectively couple or uncouple a pair of toothed members through which driving along a particular torque path takes place. Axial movement of the sleeve member in one direction meshes splines thereof with teeth on the two members in order to provide the coupled relationship for transmitting torque. Axial movement of the shiftable member in the opposite direction disengages the splines from one of the toothed members in order to provide uncoupling.

U.S. Pat. Nos. 3,334,715, 3,367,462, and 3,537,558 disclose sleeve members whose splines have ends that are recessed in order to lock the sleeve member against axial movement during the transmission of torque. Engagement between the recessed spline ends and the teeth during torque transmission provides a locking or holding relationship that resists undesired axial movememt of the sleeve member and hence undesired disengagement of the spline and teeth. This locking or holding relationship is substantially in an edge-to-surface engagement that eventually wears the ends of the splines and the teeth engaged thereby so that each spline engages one of the teeth during torque transmission despite manufacturing tolerances so as to provide a more uniform distribution of torque forces over the splines of the sleeve member.

Certain shiftable sleeve members for transmitting torque are movable axially in opposite directions to selectively couple a first toothed member or gear with either of a pair of toothed members spaced axially from each other on opposite sides of the first toothed member. Axial locking of the sleeve member to either of the two spaced toothed members is achieved by providing the recesses in both ends of each spline. Consequently, the teeth of one of the members are meshed with the recessed spline ends at one axial end of the sleeve member during torque transmission. If space requirements are not particularly confined, the gear teeth and splines may have a great enough axial length so that there is sufficient engagement for coupling the sleeve member to the gear in proper axial alignment without any cocking. However, in confined spaces, the gear teeth and the splines of the sleeve member must be relatively short in an axial direction and the engagement therebetween is not sufficiently great to provide proper axial guiding of the sleeve member as it is moved into meshing engagement with either of the toothed members spaced on its axial opposite sides. Furthermore, the short axial length of the splines, compounded by the recessed or relieved portions at their ends, reduces the area of the working face that can transmit torque forces to an undesirable degree with very small assemblies, and aggravate the cocking or misalignment problem during torque transmission.

It has previously been proposed to provide opposed faces on selected adjacent pairs of splines of a torque transmitting sleeve member with ends that are recessed on one face but are not recessed on the other face in order to increase the spline and gear tooth engagement area during transmission of torque. Other splines of the sleeve member have the recessed ends on both faces. However, with this arrangement, among other things, as is discussed below, there is an uneven distribution of torque forces on the splines.

DISCLOSURE OF THE INVENTION

An object of the present invention is to provide torque transmitting apparatus including a shiftable sleeve member having an improved locking and guiding spline construction for axially guiding and coupling the sleeve member between a gear and either one of a pair of toothed members spaced on axial opposite sides of the gear.

In carrying out the above object and other objects of the invention, the sleeve member has a plurality of splines spaced circumferentially about its central axis. At least one of the splines is a locking spline with working faces whose opposite ends include recesses for providing axial locking of the sleeve member during the transmission of torque. The recesses at each end of each locking spline are spaced from each other with substantially the same minimum chordal relationship as each other locking spline end. At least one of the splines on the sleeve member is a guiding spline with working faces that have a chordal thickness therebetween which is substantially equal to or less than the corresponding minimum chordal thickness between the recesses at the ends of each locking spline.

Preferably, the sleeve member has a plurality of the locking splines and a plurality of the guiding splines. A first toothed member or gear has teeth whose working faces are meshed with the working faces of the locking and guiding splines so as to allow axial shifting thereof in opposite directions toward either one of a pair of toothed members spaced on axial opposite sides of the gear. The guiding splines provide a properly aligned relationship of the sleeve member with the gear and either one of the other two toothed members upon moving into a meshing engagement therewith, while the locking splines lock the sleeve member against axial movement during torque transmission by receiving teeth within their recesses.

In one preferred embodiment of the sleeve member, the locking splines and the guiding splines are arranged in an alternating relationship with each other. Another preferred embodiment of the sleeve member includes three guiding splines which are circumferentially spaced from each other so as to provide proper guiding of the member during movement into and out of meshing engagement between the central gear and either one of the toothed members spaced on opposite sides of the gear. Preferably, the three guiding splines of the latter embodiment are substantially equally spaced from each other circumferentially about the central axis of the sleeve member.

Apparatus embodying the invention includes a driving member and a driven member axially movable with respect to each other; guide means for maintaining proper axial alignment of the driving and driven members during relative axial movement thereof; at least one spline on one of said members having a cam surface formed on the working face thereof for at least a portion of the length of said working face; at least one tooth on the other of said members engaged with cam surface of said spline with a substantial edge-to-surface contact. The cam surface has a configuration such that torque forces between the splines and tooth produce an axial component of force to resist axial guided movement between said driving and driven members.

Other objects, features, and advantages of the present invention are readily apparent from the following description of the best mode for carrying out the invention taken in connection with the accompanying drawings.

BEST MODE FOR CARRYING OUT THE INVENTION

Figure 1:
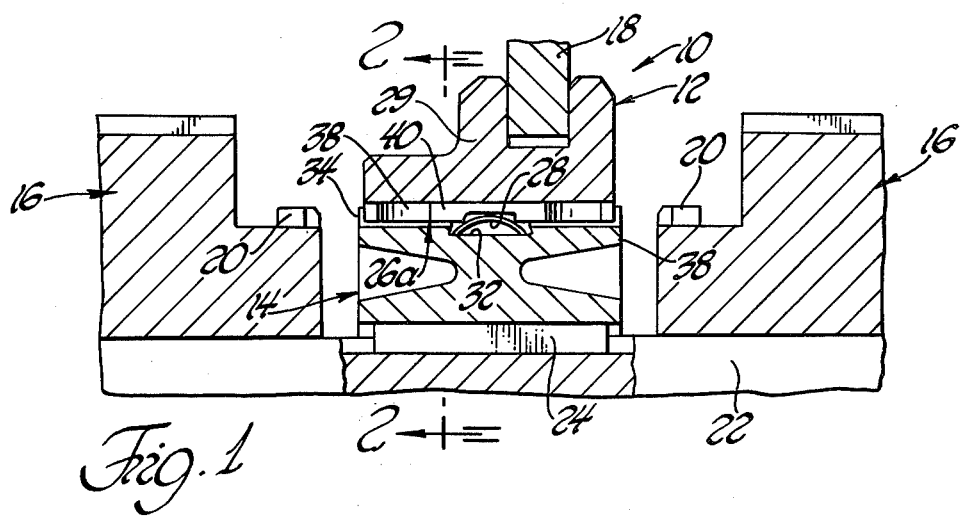
FIG. 1 is a partial sectional view through one embodiment of torque transmitting apparatus constructed according to the present invention.

Referring to FIG. 1 of the drawings, apparatus constructed according to the present invention is indicated collectively by reference numeral 10 and includes an axially shiftable sleeve member 12 for selectively coupling a toothed hub member or gear 14 with either one of a pair of toothed members 16 spaced on opposite axial sides of the gear. Sleeve member 12 is moved axially to the left or the right by a shifter fork or other type of selector member 18 from the center or neutral position shown in order to couple the gear 14 with teeth 20 on one of the toothed members 16. It should be noted that each of the toothed members 16 has an annular shape and is free to rotate about the central axis of a shaft 22. Sleeve member 12 and gear 14 also have annular shapes coaxial with the shaft 22 which is rotatably secured by a key 24 to a gear. Consequently the shaft 22 is selectively coupled with one of the toothed members 16 by axial movement of the sleeve member 12 in either direction from the neutral position shown.

Figure 2:
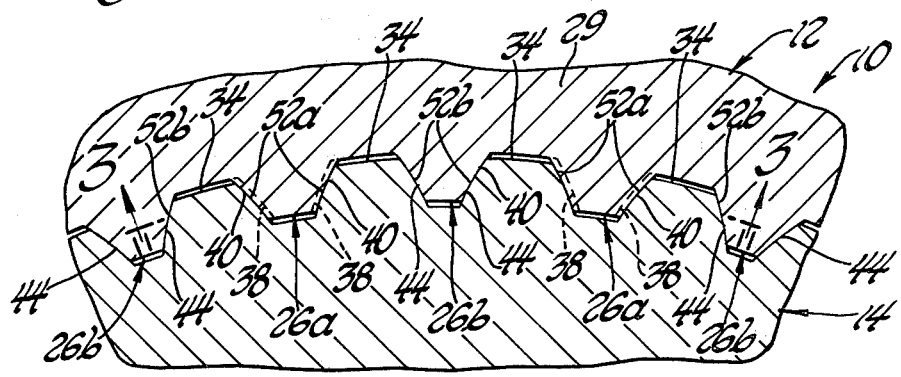
FIG. 2 is a sectional view taken in an axial direction along line 2—2 of FIG. 1.
Figure 5:
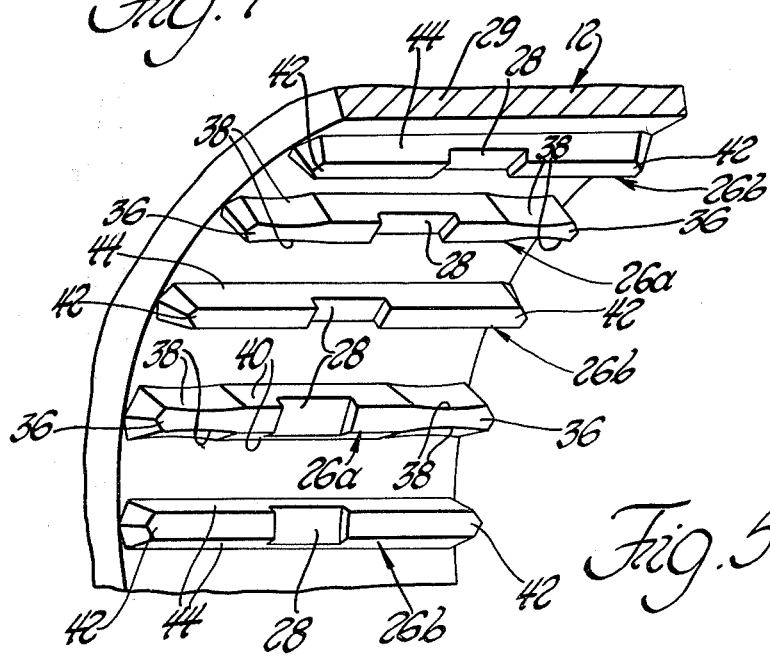
FIG. 5 is a perspective view of the inside of the sleeve member.

Referring to FIGS. 1, 2 and 5, sleeve member 12 includes an annular body 29. The sleeve member includes a set of internal locking and guiding splines 26a and b respectively, that alternate with each other and project inwardly from the inner surface of the sleeve and extend between the opposite axial ends thereof. Each of the splines 26a and b is formed with a groove 28 intermediate its ends for receiving an associated detent spring means 30 which is captured within a groove 32 of the gear 14 as shown in FIG. 1. Sleeve member 12 is thus biased against movement from the neutral position of FIG. 1 by the cooperation between detent spring means 30 and the spline grooves 28.

External teeth 34 of gear 14 are meshed with the sleeve member splines 26a and b as shown in FIG. 2 such that the cooperable action therebetween provides a properly aligned relationship between the sleeve member and the gear and also provides axial locking of the sleeve member during transmission of torque with one of the toothed members 16. Axial shifting of the sleeve member to the left or the right meshes the ends of the splines 26a and b with the teeth 20 on one of the toothed members 16. Teeth 20 are arranged in a circular spacing about the axis of rotation and are uniformly spaced from each other. Splines 26a and b have pointed axial ends and each tooth 20 likewise has a pointed shape so as to facilitate the shifting of the splines into the intermeshed relationship with these teeth.

Figure 3:
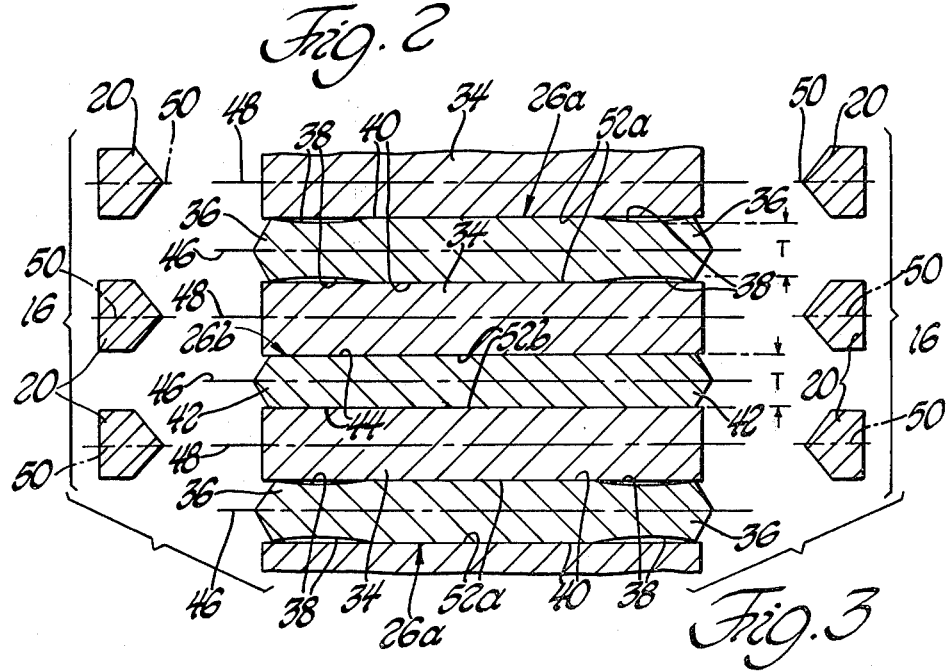
FIG. 3 is a sectional view taken in a radial direction along line 3—3 of FIG. 2.

Referring to FIGS. 3 and 5, each of the locking splines 26a has axially spaced locking ends 36 including a pair of recesses 38 machined into the opposite working faces 40 of the splines. Between the recesses, the working faces 40 are spaced from each other in a uniform relationship over the length of the spline. Each spline locking end has its recesses 38 spaced from each other with the same minimum chordal relationship as each other locking spline end. Of course, in the illustrated embodiment, the minimum chordal distance or thickness between each associated pair of recesses varies between the root and tip of the spline (FIG. 2) but is the same for each spline at a corresponding radius from the central axis of the sleeve member. The term "chordal thickness" relates to the circumferential width or thickness between the working faces of a spline.

The sleeve member splines 26b shown in FIGS. 2, 3 and 5 each have opposite axial ends 42 spaced from each other the same distance as the locking ends 36 of the splines 26a. Working faces 44 of each guiding spline extend between the ends thereof spaced from each other so that the chordal thickness of the spline is equal to or less than the corresponding minimum chordal thickness between the pair of recesses 38 at the ends of each locking spline. As is apparent from FIG. 2, the chordal thickness between the working faces 44 of the guiding splines 26b varies from the tip of the spline to its root but for any given radius from the axis of rotation is substantially equal to or less than the corresponding chordal thickness T (FIG. 3) between the opposite relieved areas or recesses 38 of the locking splines 26a.

As seen in FIG. 3, the locking and guiding splines 26a and b have centerlines 46 spaced from each other in a uniform relationship which is equal to the spacing between centerlines 48 of the gear teeth 34 and centerlines 50 of the teeth 20. The working faces 40 of each spline 26a are spaced from the associated centerline 46 the same distance as each other and the maximum distance therebetween is less than the spacing between the teeth 20 so as to enable the spline ends to move into a meshed relationship with the teeth 20 upon axial shifting of the sleeve member. Each guide spline 26b also has the working faces 44 thereof spaced from the associated spline centerline 46 an equal distance which, as previously described, is equal to the corresponding minimum chordal thickness of the locking splines at their recesses 38. Working faces 52a of the gear teeth 34 engage the working faces 40 of the locking splines 26a while working faces 52b of the gear teeth engage the working faces 44 of the guiding splines 26b. Consequently, each working face 52a is spaced from the associated tooth centerline 48 a lesser distance than the associated working face 52b due to the difference in chordal thicknesses of the locking and guiding splines 26a and b.

Figure 6:
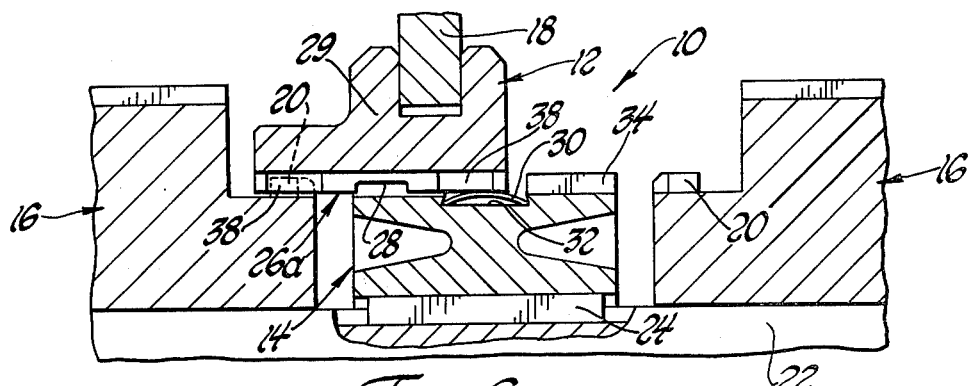
FIGS. 6 and 7 are views similar to FIGS. 1 and 3 but with the sleeve member shifted from a neutral position to couple the gear with one of the toothed members.
Figure 7:
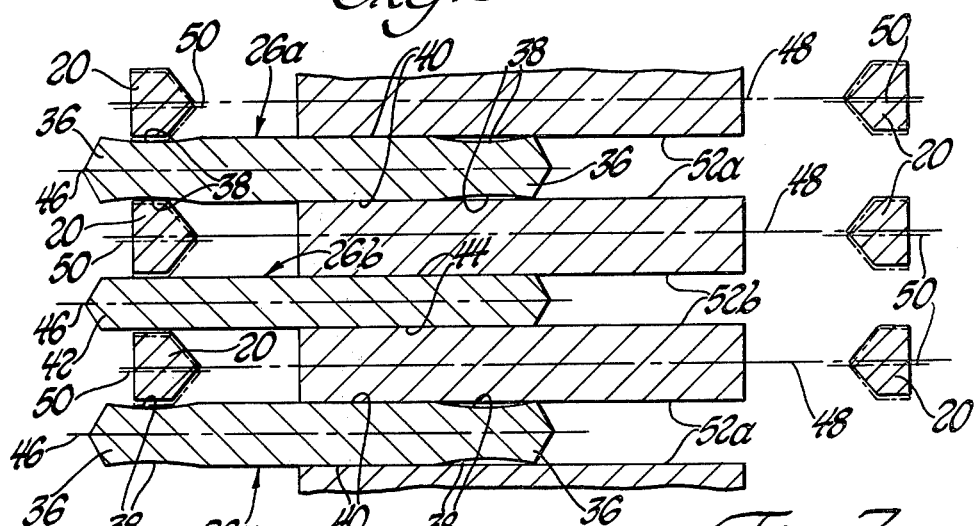

Upon axial shifting of the sleeve member 12 from the neutral position such as shown in FIGS. 6 and 7, spline ends 36 and 42 at one axial end of the sleeve member are meshed with the teeth 20 of one toothed member 16 while the other ends of the splines remain meshed with the teeth 34 of the gear 14. Recesses 38 of the locking splines then receive the teeth 20 to prevent undesired axial shifting of the sleeve member during the transmission of torque. The ends of the guiding splines 26b meshed with the gear teeth 34 provide a properly aligned relationship of the sleeve member with the gear 14 and the toothed member 16 with which the sleeve member is meshed. This result is achieved by virtue of the chordal thickness of the guiding splines 26b which is substantially equal to or less than the corresponding minimal chordal thickness of the locking splines at their recesses 38.

Figure 4:
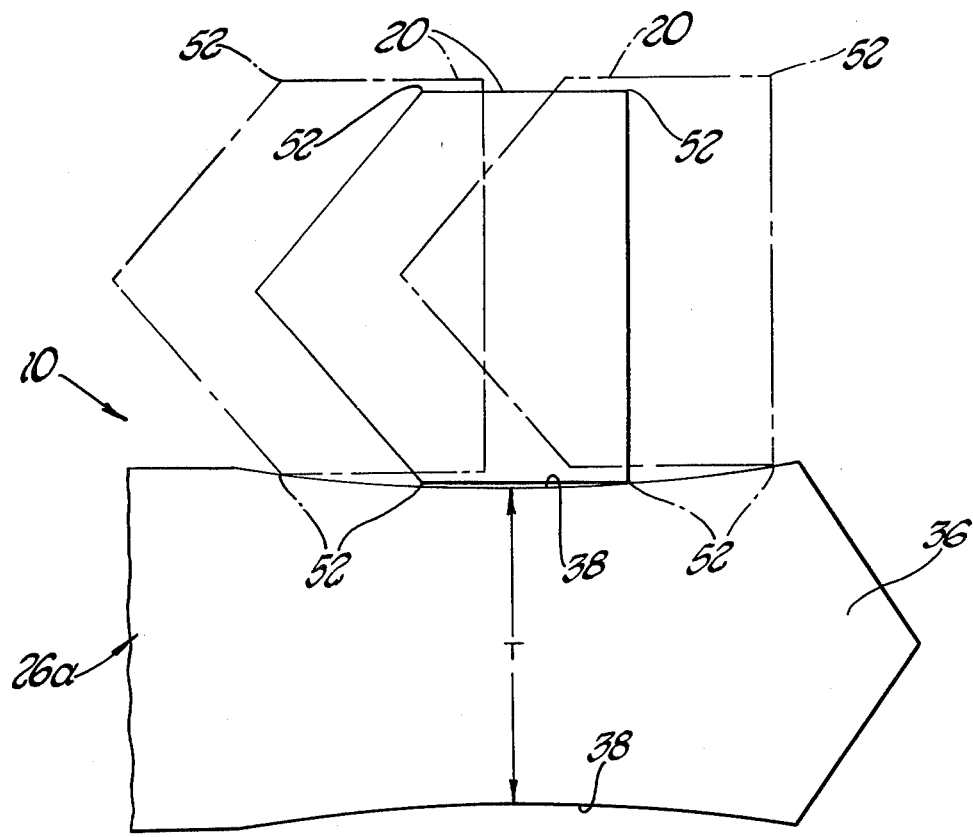
FIG. 4 is an enlarged view of a portion of FIG. 3 and illustrates the initial shape of each locking spline end on the sleeve member and the teeth engaged thereby during torque transmission.
Figure 9:
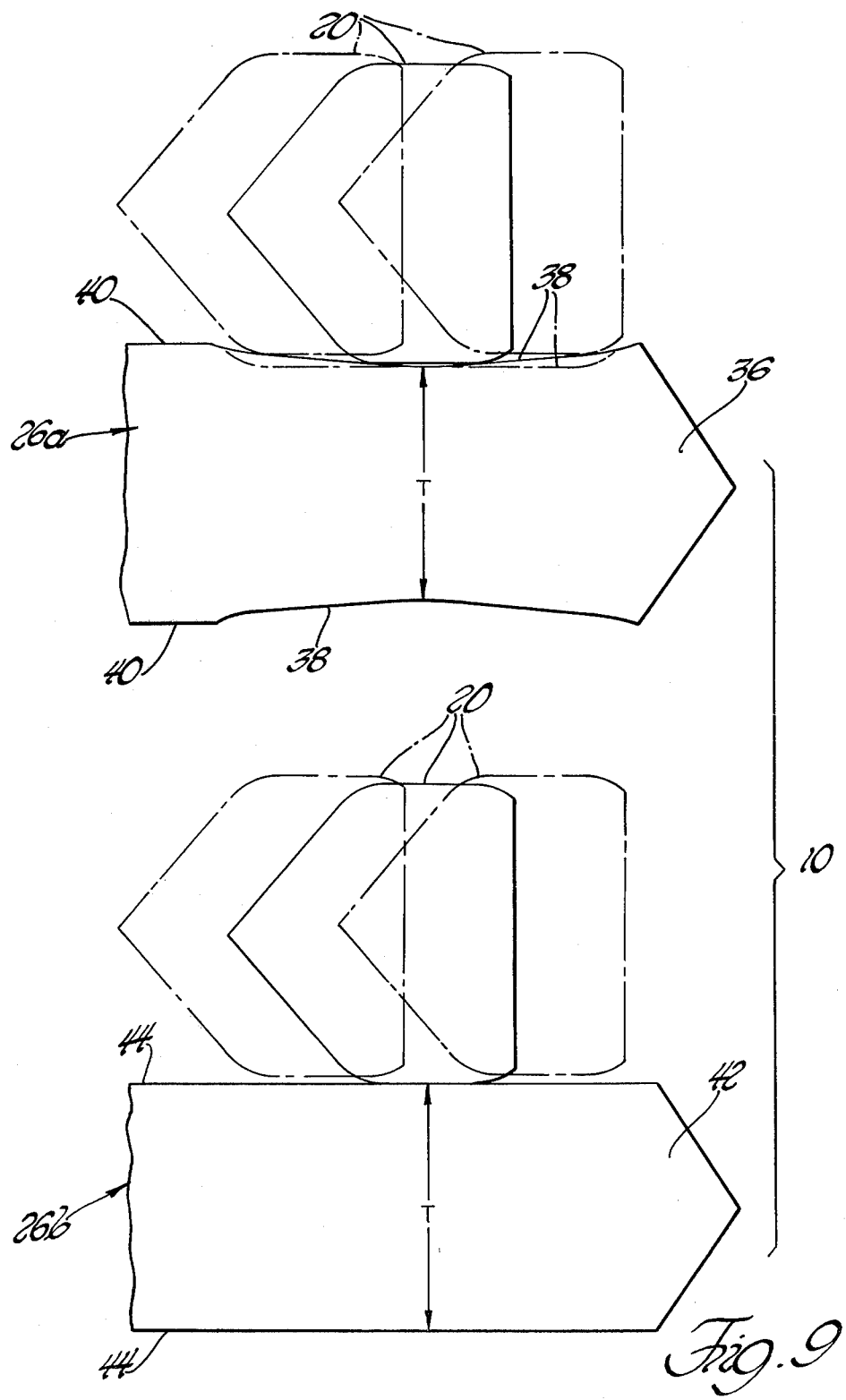
FIG. 9 is a view similar to FIG. 4 illustrating the manner in which both the locking and guiding splines cooperate with the teeth engaged thereby during torque transmission and also illustrating the progressive wear of the teeth and the recesses of the locking spline.

Initially, the edges 52 of the teeth 20 are machined sharp as indicated in FIG. 4, or the edges may be chamfered as shown, for example, in U.S. Pat. No. 3,334,715. The manufacturing tolerances are such that various of the teeth 20 may engage a particular locking spline 26a at different positions along the length of the spline 26a as illustrated in FIG. 4. However, in all positions, one of the edges 52 of each tooth 20 engages the recess 38 with a substantial edge-to-surface contact. The edge-to-surface contact appears as a point contact in FIG. 4. Over a period of torque transmitting operation of the assembly, there occurs progressive mutual wear of the corners or edges 52 of the teeth 20 and the recess 38. This action is discussed in detail in the specification of the above referred to U.S. Pat. No. 3,334,715 in lines 40 et seq. of Column 5 thereof. Thus, during the initial period of operation, there will likely be a separation between the tooth 20 and associated guide spline 26b as shown in the phantom line position of teeth 20 in FIG. 9. As the wear progresses on the corners of the teeth 20 and the recesses 38, the torque transmitting position of the teeth 20 will progressively move toward the working surface 44 of the guide spline 26b as shown in the full line position of teeth 20 in FIG. 9. If the chordal thickness T of a particular guide spline 26b is significantly less the the minimum chordal thickness T of the locking spline 26a at the recessed portions 38, the tooth 20 meshed with that guide spline will not seat against the guide spline working surface 44. However, this is acceptable, particularly if the member of guide splines 26b is significantly less than the number of locking splines 26a; even if some or all the guide splines serve no torque transmitting function, they will serve their necessary function as guide splines to prevent axial misalignment of the various components 12, 14, and 16. If the chordal thickness T of the guide spline 26b is substantially equal to or only slightly less than the minimum chordal thickness T of the locking splines 26a at the recesses 38, at least some of the teeth 20 will seat against the guide spline working surface 44 in torque transmitting relationship therewith as the teeth 20 meshed with the locking splines 26a seat against the recess 38 at the point of minimum chordal thickness T after progressive wear of the recess 38 to the phantom line configuration shown in FIG. 9.

Figure 8:
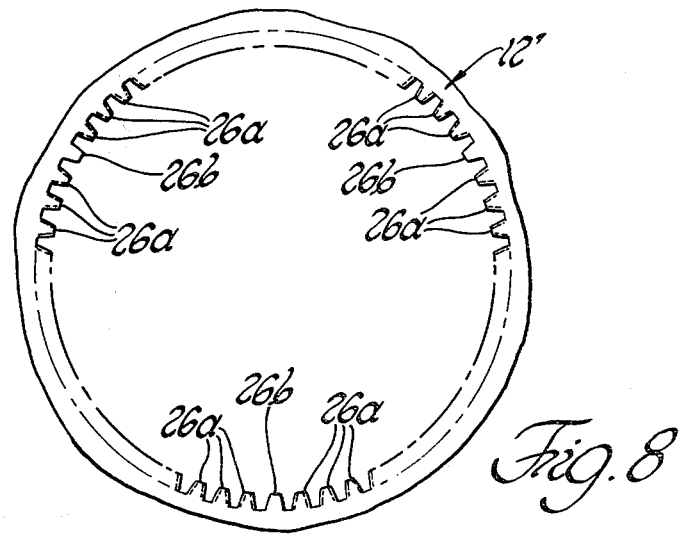
FIG. 8 is an end view illustrating another preferred embodiment of the sleeve member.

FIG. 8 illustrates an embodiment of the shiftable sleeve member as indicated by 12' having three guiding splines 26b spaced circumferentially from each other with the locking splines 26a positioned therebetween. The three guiding splines 26b are positioned at substantially equal angles from each other (120°) for the most efficient axial guiding action as the sleeve member moves from one position to another.

If the sleeve member is considered to be a driving member, the invention as shown in the illustrated embodiment includes a driving member 12 and a driven member 16 axially movable with respect to each other; guide means 26b for maintaining proper axial alignment of member 12 and 16 during relative axial movement thereof; at least one spline 26a on one of said members having a cam surface 38 formed on the working face 40 thereof for at least a portion of the length of said working face; at least one tooth 20 on the other of said members engaged with the cam surface of said spline with a substantial edge-to-surface contact such that torque transmitting forces between the spline 26a and tooth 20 produces an axial component of force to resist axial guided movement between the driving and driven members. Obviously, the indication of the sleeve member as the driving member is arbitrary and is suggested by way of example only. The sleeve member can as well be the driving member as the driven member.

Figure 10:
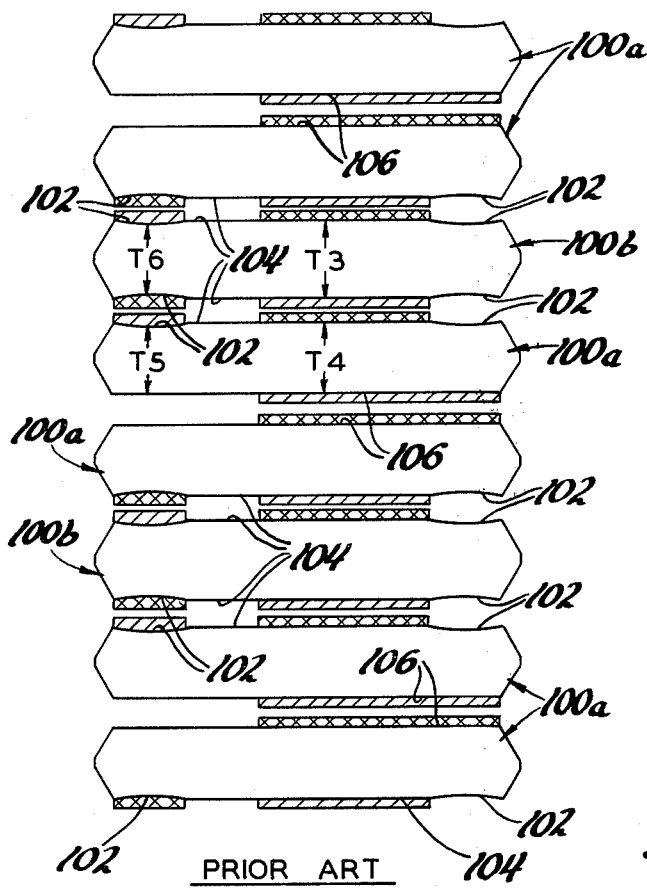
FIG. 10 is a diagrammatic view of the splines of a prior art sleeve illustrating the pressure distribution on the splines thereof during torque transmission.
Figure 11:
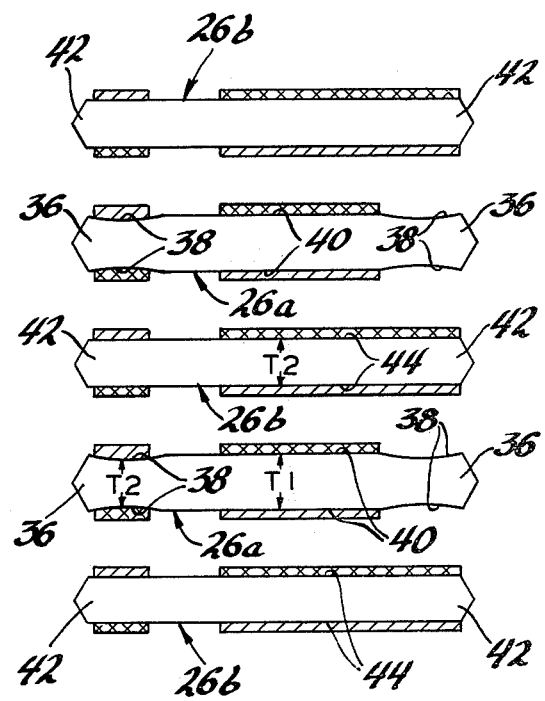
FIG. 11 is a diagrammatic view of the teeth of a sleeve according to the present invention illustrating the pressure distribution in the splines thereof during torque transmission.

FIGS. 10 and 11 respectively illustrate torque load distribution patterns on splines of a proposed prior art shiftable sleeve member and splines of a sleeve member construction according to the present invention. With each sleeve member, the torque load distribution of the splines thereof in one direction of driving is illustrated by single hatched lines while the loading in the other direction is illustrated by double hatched lines, the hatched lines are used as graphic symbols and not to be regarded as physical elements. Both views are shown in condition which corresponds to the driving relationship shown in FIGS. 6 and 7 where the sleeve member has been shifted to the left. However, the following description is likewise applicable to the loading of the splines when the sleeve member is shifted to the right.

The prior art sleeve member shown in FIG. 10 includes splines indicated by reference numerals 100a and b. Each of the splines 100a includes recesses 102 at opposite ends of one of its working faces 104, and the other of its working faces 106 is straight and has no recesses. Each of the straight working faces 106 is disposed in adjacent relationship with another straight working face 106. Each of the splines 100b includes recesses 102 at opposite ends of both of its working faces 104. Working faces 104 are spaced by a chordal thickness T3 on each spline while working faces 104 and 106 are spaced by a chordal thickness T4. Recesses 102 are spaced from the working faces 106 by a chordal thickness T5 and the pairs of recesses 102 are spaced from each other by a chordal thickness T6.

The straight working faces 106 provide a guiding action while the recesses 102 provide for locking against undesired axial shifting during the transmission of torque. As torque is transmitted, the torque forces are distributed over the lower sides of the splines in one direction of rotation but are distributed over their upper sides in the opposite direction of rotation. Each spline 100 having a recessed working face 102 and straight working face 106 for guiding has a different pattern of torque load distribution depending on the direction of torque. Since the portion of the working faces 104 between the recesses has less length than the straight working faces 106, consequently, there is a more concentrated distribution than torque forces in faces 104 and hence a higher unit loading. Consequently, the chordal thickness T4 must be great enough to provide strength for the higher unit loading on the working face 104.

In FIG. 11, the torque forces are distributed uniformly over the working faces 40 and 44, respectively, of the locking splines 26a and guiding splines 26b the direction of the torque forces about the axis of rotation. Each working face 40 of the locking splines 26a is loaded uniformly regardless of whether the loading is on the upper or lower face of the spline as viewed in the drawings. Likewise, each working face 44 of the guiding splines 26b is loaded uniformly regardless of whether the loading is on the upper or lower face of the spline as viewed in the drawings. A greater number of splines for a sleeve member of a given diameter is possible than is the case with the prior art type of splines shown in FIG. 10, and the uniform torque load distribution permits a uniform cross-section for each tooth over the load carrying portion thereof.

The provisions of alternate guiding and locking splines of the type shown in FIG. 10 provides a smoother tracking or guiding means for intentional disengagement from teeth 20 in FIG. 7. This minimizes misalignment and reduces binding forces on the shifter member 18 and FIG. 6.

While preferred embodiments of the torque transmitting apparatus have herein been described in detail, those familiar with this art will recognize various alternative designs and embodiments for practicing the present invention as defined by the following claims.

What is claimed is:

1. Torque transmitting apparatus comprising: a shiftable sleeve member having a plurality of splines spaced circumferentially about the central axis thereof; said splines including at least one locking spline having opposite ends and a pair of working faces extending therebetween; each working face of each locking spline having a pair of recesses respectively adjacent the opposite spline end in order to provide axial locking of the sleeve member during the transmission of torque; the recesses at each end of each locking spline being spaced from each other with substantially the same minimum chordal relationship as each other locking spline end; said splines also including at least one guiding spline having opposite ends and a pair of working faces extending therebetween; and each guiding spline having a chordal thickness between the working faces thereof which is constant over its axial length and substantially equal to or less than the corresponding minimum chordal thickness between the recesses at the ends of each locking spline.

2. Torque transmitting apparatus comprising: a shiftable sleeve member having a plurality of splines spaced circumferentially about the central axis thereof; said splines including at least one locking spline having opposite ends and a pair of working faces extending therebetween; each working face of each locking spline having a pair of recesses respectively adjacent the opposite spline ends in order to provide axial locking of the sleeve member during the transmission of torque; the recesses at the ends of each locking spline being spaced from each other with substantially the same minimum chordal relationship as each other locking spline end; said splines also including at least one guiding spline having opposite ends and a pair of working faces extending therebetween; each guiding spline having a chordal thickness between the working faces thereof which is constant over its axial length and substantially equal to or less than the corresponding minimum chordal thickness between the recesses at the ends of each locking spline; and a toothed member whose teeth have working faces that mesh with the working faces of the locking and guiding splines while allowing axial shifting thereof in opposite directions such that the sleeve member is capable of rotatably coupling the toothed member in an axially locked relationship with either of a pair of toothed members on opposite sides thereof.

3. Torque transmitting apparatus comprising: a shiftable sleeve member having a plurality of splines spaced circumferentially about the central axis thereof; said splines including a plurality of locking splines each of which has opposite ends and a pair of working faces extending therebetween; each working face of each locking spline having a pair of recesses respectively adjacent the opposite spline ends in order to provide axial locking of the sleeve member during the transmission of torque; the recesses at the ends of each locking spline being spaced from each other with substantially the same minimum chordal relationship as each other locking spline; said splines also including a plurality of guiding splines each of which has opposite ends and a pair of working faces extending therebetween; each guiding spline having a chordal thickness between the working faces thereof which is constant over its axial length and substantially equal to or less than the corresponding minimum chordal thickness between the recesses at the ends of each other locking spline; a first toothed member whose teeth have working faces that mesh with the working faces of the locking and guiding splines while allowing axial shifting thereof in opposite directions; and a pair of axially spaced toothed members located on axial opposite sides of the first toothed member and having teeth which are spaced to mesh in an axially locked relationship with the recesses in the ends of the locking splines upon axial shifting of the sleeve member in one direction or the other.

4. Torque transmitting apparatus comprising: a shiftable sleeve member having a plurality of splines spaced circumferentially about the central axis thereof; said splines including alternate locking splines each of which has opposite ends and a pair of working faces extending therebetween; each working face of each locking spline having a pair of recesses respectively adjacent the opposite spline ends in order to provide axial locking of the sleeve member during the transmission of torque; the recesses at the ends of each locking spline being spaced from each other with substantially the same minimum chordal relationship as each other locking spline; said splines also including alternate guiding splines having opposite ends and a pair of working faces extending therebetween; each guiding spline having a chordal thickness between the working faces thereof, which is constant over its axial length and equal to or less than the corresponding minimum chordal thickness between the recesses at the ends of each locking spline; and a toothed member whose teeth have working faces that mesh with the working faces of the locking and guiding splines while allowing axial shifting thereof in opposite directions such that the sleeve member is capable of rotatably coupling the toothed member in an axially locked relationship with either of a pair of toothed members on opposite sides thereof.

5. Torque transmitting apparatus comprising: a driving member and a driven member axially movable with respect to each other; guide means including at least one guiding spline on one of said members which has a constant chordal thickness over its axial length for maintaining proper axial alignment of said member during relative axial movement thereof; lock means including at least one locking spline on one of said members having a cam surface formed on the working face thereof for at least a portion of the length of said working face for locking the driving member and driven member against axial shifting when said members have been moved axially into engagement; at least one tooth on the other of said members engaged with the cam surface of said locking spline with a substantial edge-to-surface engagement, said cam surfaces being formed at opposed ends of each locking spline in adjacent working faces with a minimum chordal thickness therebetween which is substantialy equal or greater than the chordal thickness of each guiding spline and having a configuration such that torque forces between said locking spline and tooth produces an axial component of force to resist axial guide movement between said driving and driven members; said guide means and lock means being constructed to have torque forces distributed uniformly over the cam length thereof in either direction of rotation.

* * * * *

UNITED STATES PATENT AND TRADEMARK OFFICE
CERTIFICATE OF CORRECTION

PATENT NO. : 4,181,210

DATED : January 1, 1980

INVENTOR(S) : William H. Bibbens

It is certified that error appears in the above-identified patent and that said Letters Patent are hereby corrected as shown below:

Column 5, line 63
"member" should be --number--.

Column 7, line 38,
"and" should be --of--.

Column 7, line 52 (Claim 1, line 7) "end" should be --ends--.

Column 10, line 10 (Claim 5, line 13) "substantialy" should be --substantially--.

Signed and Sealed this

Eighth Day of July 1980

[SEAL]

*Attest:*

*Attesting Officer*

SIDNEY A. DIAMOND

*Commissioner of Patents and Trademarks*